(12) United States Patent
Verdun

(10) Patent No.: US 8,000,477 B2
(45) Date of Patent: Aug. 16, 2011

(54) DATA SECURITY SYSTEM AND METHOD FOR HIGH BANDWIDTH BUS

(75) Inventor: Gary J. Verdun, Georgetown, TX (US)

(73) Assignee: Dell Products L.P., Round Rock, TX (US)

(*) Notice: Subject to any disclaimer, the term of this patent is extended or adjusted under 35 U.S.C. 154(b) by 1058 days.

(21) Appl. No.: 11/445,414

(22) Filed: Jun. 1, 2006

(65) Prior Publication Data

US 2007/0280478 A1    Dec. 6, 2007

(51) Int. Cl.
*H04L 9/00* (2006.01)
*G06F 21/00* (2006.01)
(52) U.S. Cl. .......... 380/265; 380/268; 708/252
(58) Field of Classification Search .......... 380/255, 380/259, 264, 265, 267, 268; 708/100, 200, 708/250, 252
See application file for complete search history.

(56) References Cited

U.S. PATENT DOCUMENTS

| | | | |
|---|---|---|---|
| 3,988,538 A | 10/1976 | Patten | |
| 4,314,097 A * | 2/1982 | Campbell, Jr. | 713/170 |
| 4,965,881 A | 10/1990 | Dilley | |
| 5,163,092 A | 11/1992 | McNesby et al. | |
| 5,185,799 A | 2/1993 | McNesby et al. | |
| 5,854,840 A * | 12/1998 | Cannella, Jr. | 380/268 |
| 6,163,284 A | 12/2000 | Munakata | |
| 6,163,865 A * | 12/2000 | Kempsey | 714/733 |
| 6,594,094 B2 * | 7/2003 | Rae et al. | 360/25 |
| 2002/0118837 A1 * | 8/2002 | Hamilton | 380/277 |
| 2002/0186840 A1 * | 12/2002 | Rose | 380/37 |
| 2004/0091106 A1 * | 5/2004 | Moore et al. | 380/37 |
| 2006/0093147 A1 * | 5/2006 | Kwon et al. | 380/268 |
| 2006/0126833 A1 * | 6/2006 | O'Leary et al. | 380/30 |
| 2006/0143505 A1 | 6/2006 | Olarig et al. | |
| 2007/0061642 A1 * | 3/2007 | Currivan et al. | 714/724 |

* cited by examiner

*Primary Examiner* — Gilberto Barron, Jr.
*Assistant Examiner* — Abdulhakim Nobahar
(74) *Attorney, Agent, or Firm* — Haynes and Boone, LLP

(57) ABSTRACT

A data security system for a high bandwidth bus comprises a circular shift register operable to load a variable key value, and a scrambler coupled to the circular shift register operable to receive the variable key value from the circular shift register and serially scramble a serial data input in response to the variable key value.

20 Claims, 3 Drawing Sheets

DATA SECURITY SYSTEM AND METHOD FOR HIGH BANDWIDTH BUS

BACKGROUND

The present disclosure relates generally to information handling systems, and more particularly to data security for a high bandwidth bus.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

PCI EXPRESS is a high bandwidth input/output (I/O) interface or data bus that may be incorporated in IHS computer platforms. Because of its high speed capabilities, PCI EXPRESS is often used in graphics and multimedia streaming data applications. However, PCI EXPRESS is not an encrypted bus and does not provide security for the streamed data, which becomes vulnerable to devices that can snoop the bus and uncover the data.

Because of the high bandwidth and high performance requirements of the PCI EXPRESS bus and other I/O busses like it, the logic and/or encryption required to provide data security would be very complex and prohibitively expensive.

Accordingly, it would be desirable to provide a way to provide security for streaming data over an unencrypted bus absent the disadvantages found in the prior methods discussed above.

SUMMARY

According to one embodiment, a data security system for a high bandwidth bus comprises a variable key value, and a scrambler operable to receive the key value and serially scramble a serial data input in response to the key value.

According to another embodiment, a data security method for a high bandwidth bus comprises initializing a scrambler with the key value, obtaining N-bits of data input to be transmitted over the high bandwidth bus, scrambling the N-bits of data input in response to the key value to generate a scrambled data output, and transmitting the scrambled data output over the high bandwidth bus.

According to yet another embodiment, an IHS coupled to a high bandwidth I/O bus comprises a microprocessor, a memory, a video controller, a circular shift register operable to load a variable key value, and a scrambler coupled to the circular shift register and the video controller and operable to receive the key value from the circular shift register and serially scramble a serial data input in response to the key value.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various I/O devices, such as a keyboard, a mouse, and a video display. The IHS may also include one or more buses operable to transmit communications between the various hardware components.

Figure 1:
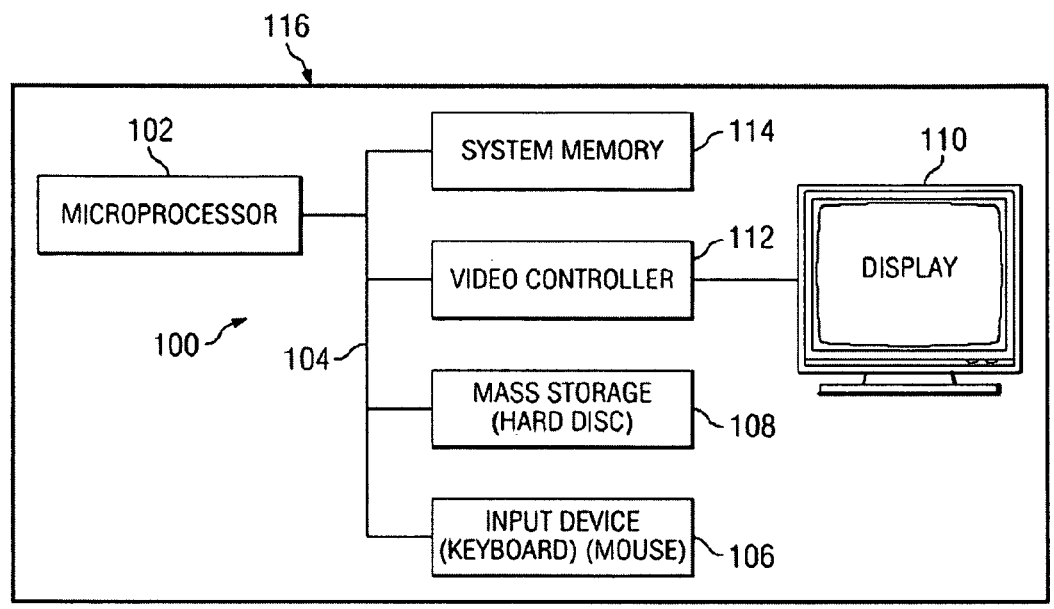
FIG. 1 is a simplified top level block diagram of an IHS.

In one embodiment, IHS 100, FIG. 1, includes a microprocessor 102, which is connected to a bus 104. Bus 104 serves as a connection between microprocessor 102 and other components of computer system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to microprocessor 102. Mass storage devices include such devices as hard disks, optical disks, magneto-optical drives, floppy drives and the like. IHS system 100 further includes a display 110, which is coupled to microprocessor 102 by a video controller 112. A system memory 114 is coupled to microprocessor 102 to provide the microprocessor with fast storage to facilitate execution of computer programs by microprocessor 102. In an embodiment, a chassis 116 houses some or all of the components of IHS 100. It should be understood that other buses and intermediate circuits can be deployed between the components described above and microprocessor 102 to facilitate interconnection between the components and the microprocessor.

Figure 2:
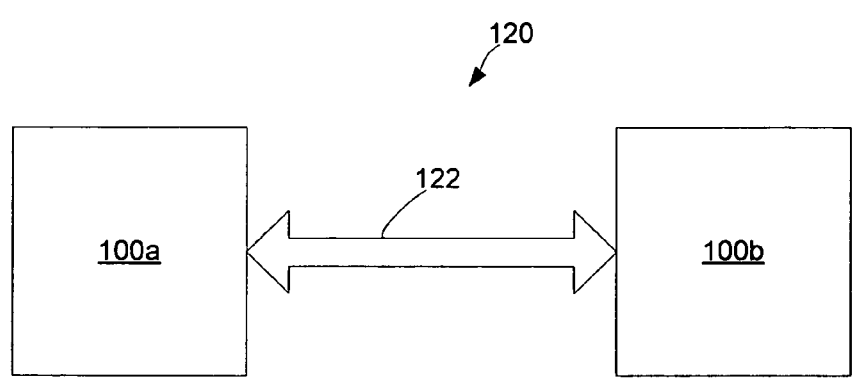
FIG. 2 is a simplified top level block diagram of an exemplary operating environment for a data security system and method for a high bandwidth bus.

FIG. 2 is a block diagram of an exemplary operating environment 120 for a data security system and method for a high bandwidth bus. IHS system 100*a* and IHS system 100*b* are coupled to one another via a high bandwidth and high speed I/O bus 122 such as a PCI EXPRESS bus. The data carried on I/O bus 122 may be graphics or multimedia streaming data. The data security system and method for a high bandwidth bus described herein are operable to scramble the serial data stream and provide data security without using complex and expensive hardware or software.

Figure 3:
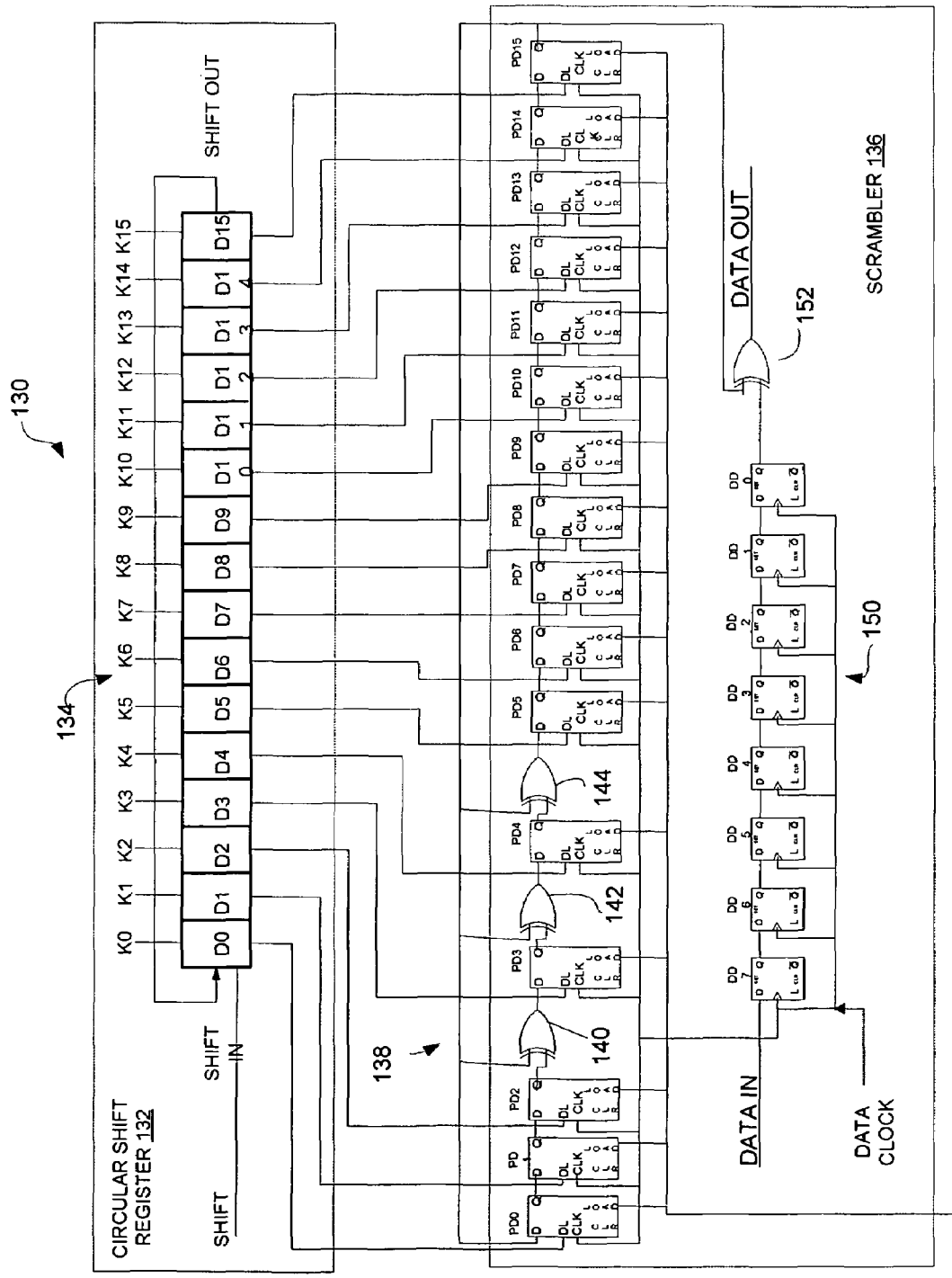
FIG. 3 is a block diagram of an embodiment of a data security system for a high bandwidth bus.

FIG. 3 is a block diagram of an embodiment of a data system 130 for a high bandwidth bus. System 130 comprises a circular shift register 132 comprising a plurality of serially-coupled D flip-flops D0-D15 134, and a scrambler 136. Circular shift register 132 is operable to load an N-bit key, shown herein as a 16-bit key (K0-K15), and is further operable to sequentially shift the data bits of the key in a circular fashion. Scrambler 136 comprises a linear feedback shift register (LFSR) 138 having a plurality of serially-coupled loadable D flip-flops PD0-PD15 and XOR (exclusive OR) gates 140-144. LFSR 138 is coupled to circular shift register 132 so that it may be loaded with the key data bits therefrom on a LOAD command signal. Scrambler 136 further comprises an eight-bit register 150 comprising serially-coupled D flip-flops DD7-DD0 150 receiving the serial data to be transmitted over the I/O bus as input (DATA IN). The serial output of register 150 is coupled to one input of an XOR gate 152, which receives as its other input the output from LFRS 138. It may be seen that scrambler 136 implements the polynomial:

$$G(S)=X^{16}+X^5+X^4+X^3+1$$

Although the number of bits in circular shift register 132 or the key is shown herein as the same as that of the LFSR, the number of bits in the key may be greater than the number of bits in LFSR 138. LFSR 138 and register 150 share a common data clock signal (DATA CLOCK) so that their data bit-shifting is synchronized.

Scrambler 136 of system 130 is a physical layer component defined in the PCI EXPRESS I/O bus specification, which specifies that the scrambler is loaded or initialized with a fixed data pattern called a "COM" character. Originally, the function of the scrambler is to guarantee a minimum frequency of output transitions even if all data is logical 0's or 1's. The minimum frequency of output transitions is required to maintain synchronization between the bit clocks at the transmitting side and the receiving side. Further, the scrambler also performs the function of reducing EMI (electromagnetic interference) emissions by reducing the frequency of data bit transitions in the serial data stream. For example, a serial data sequence of maximum transition rate, 10101010 . . . , would be scrambled and transmitted over the I/O bus so that it no longer has a bit transition at each bit time.

Instead of being initialized with a fixed value, a randomly generated key stored in circular shift register 132 is loaded into LFSR 138 to scramble the data for data security purposes. A detailed description of this process is provided below with reference to FIG. 4.

Figure 4:
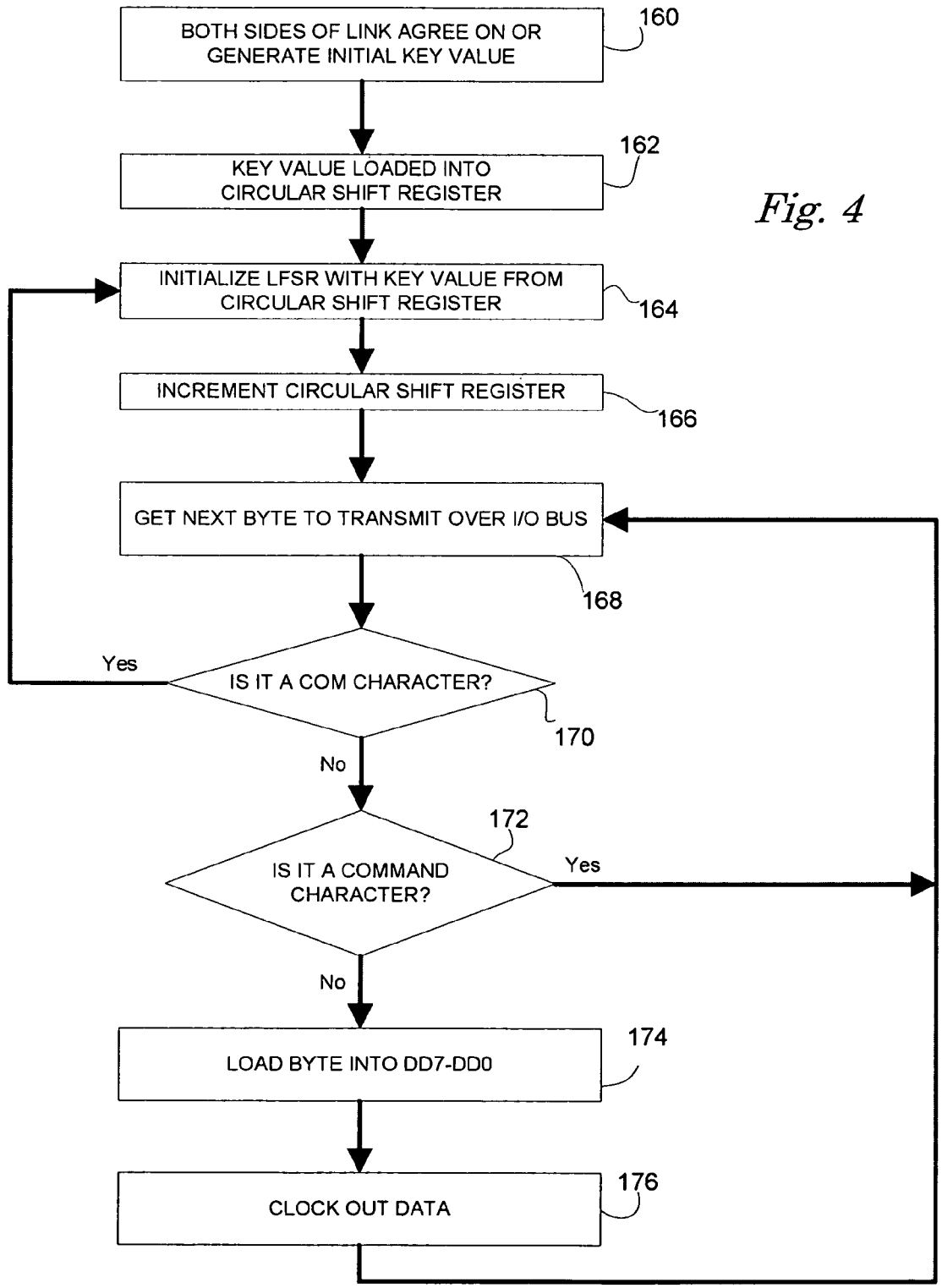
FIG. 4 is a flowchart of an embodiment of a data security method for a high bandwidth bus.

FIG. 4 is a flowchart of an embodiment of a data security method for a high bandwidth bus. In step 160, transmitting IHS 100a (FIG. 2) and receiving IHS 100b agree on an initial value of the key. There are a variety of ways to obtain and agree on a key value. For example, IHS 100a and IHS 100b may agree on a predetermined algorithm to generate the key. Alternatively, a randomly generated value may be generated at power-up or reset that is encrypted so that the endpoint device can then be unencrypted for later communications. A table of agreed-upon software-coded or hard-wired key values may be used in rotation. A randomly-generated key value may be transferred from one end to another end using a suitable encryption scheme. The decryption could be done in software on the receiving end without much performance demand as speed is not critical as in real-time data stream decryption. In step 162, the key bit values are loaded into the D flip-flops of circular shift register 132 (FIG. 3). In the embodiment shown in FIG. 3, the key is a 16-bit value. In step 164, the loadable D flip-flops of LFSR 138 is loaded with the key value from circular shift register 132. In step 166, the key data bits stored in circular shift register 132 is right-shifted so that the MSB (most significant bit), D15, becomes the LSB (least significant bit), D0.

In step 168, the next byte of serial data to be transmitted over the I/O bus is obtained. A determination is then made in step 170 as to whether the data byte represents a predetermined COM character. The COM character is transmitted over the I/O bus when a periodic re-initialization is desired. However in the embodiment of system 130 described herein, key value bits from circular shift register 132 are loaded into LFSR 138, as in step 164. This time, the key value is a bit-shifted value from the initial key value. If the data byte is not a COM character, as determined in step 170, then a determination is made as to whether the data byte is a predetermined command character. If the data byte is a command character, then execution proceeds to step 168 to obtain the next data byte to be transmitted over the I/O bus. If the data byte is not a command character, as determined in step 142, then the data byte is sequentially shifted into the D flip-flops, DD7-DD0, of register 150 in step 174. In step 176, the data byte is clocked out with the DATA CLOCK signal. It may be seen that DATA OUT is a serial data stream that is an XOR'd value from the data in register 150 and the loaded key data in LFSR 138. Thereafter, execution proceeds to step 168 to obtain the next data byte for transmission over the I/O bus, as in step 168.

The process in FIG. 4 is repeated to transmit all the serial data from one IHS to another over the I/O bus. Each time a COM character is received, the LFSR is initialized with the key value stored in the circular shift register. This key value may be one that has been agreed on by both sides of the link in step 130, or one that has been bit-shifted one or more times in step 166. It may be seen that, as a result, the serial data to be transmitted over the I/O becomes scrambled with a varying key value. Without knowledge of the initial key value, 16-bits in this example but which may be a longer value, it is extremely difficult to descramble the data stream to uncover the original data values.

Because the system and method described herein requires the addition of only a circular shift register to hold and bit-shift the key value, this is an elegantly simple solution to encrypt the serial data that does not required substantial additional processing time or significant real estate. These are especially important features for streaming multimedia or graphics data which is highly sensitive to data latency. The data security system and method described herein are therefore suitable for a high bandwidth and high speed I/O bus such as PCI EXPRESS and other similar busses.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data security system for an input/output (I/O) bus, comprising:
a circular shift register that is operable to load an initial key value and to bit-shift the initial key value to provide a bit-shifted key value, wherein the initial key value is agreed upon by a transmitter system and a receiver system, each of which are coupled to the I/O bus, before the initial key value is loaded into the circular shift register; and a scrambler that is a physical layer component of the I/O bus and that includes a linear feedback shift register (LFSR) that is operable to be initialized by receiving the initial key value from the circular shift register;

wherein the LFSR is operable, during the transmission of data over the I/O bus, to be periodically re-initialized with the bit-shifted key value provided by the circular shift register in order to scramble the data transmitted over the I/O bus.

2. The system of claim 1, wherein the LFSR is periodically re-initialized in response to receiving a predetermined data character.

3. The system of claim 1, wherein the LFSR is operable to generate a serial key value output and the scrambler further comprises:

a register operable to receive the serial data input and sequentially providing the serial data output; and an XOR gate coupled to the output of the LFSR and the register and generating an XOR value of the serial data input and the serial key value output as the serial data output.

4. The system of claim 1, wherein the LFSR implements the polynomial:

$$X^{16}+X^5+X^4+X^3+1.$$

5. The system of claim 3, wherein the LFSR and the register are clocked by a common clock signal.

6. The system of claim 1, wherein the I/O bus is a PCI Express bus.

7. A data security method for an input/output (I/O) bus, comprising:

loading an initial key value into a circular shift register, wherein the initial key value is agreed upon by a transmitter system and a receiver system, each of which are coupled to the I/O bus, before the initial key value is loaded into the circular shift register;

initializing a linear feedback shift register (LFSR) in a scrambler with the initial key value from the circular shift register;

obtaining a first set of N-bits of data input to be transmitted over the I/O bus;

scrambling the first set of N-bits of data input using the initial key value to generate a first scrambled data output;

transmitting the first scrambled data output over the I/O bus;

bit-shifting the initial key value to provide a bit-shifted key value with the circular shift register and re-initializing the LFSR in the scrambler with the bit-shifted key value from the circular shift register;

obtaining a second set of N-bits of data input to be transmitted over the I/O bus;

scrambling the second set of N-bits of data input using the bit-shifted key value to generate a second scrambled data output;

transmitting the second scrambled data output over the I/O bus.

8. The method of claim 7, further comprising:

bit-shifting the bit-shifted key value to provide a second bit-shifted key value with the circular shift register and re-initializing the LFSR in the scrambler with the second bit-shifted key value from the circular shift register;

obtaining a third set of N-bits of data input to be transmitted over the I/O bus;

scrambling the third set of N-bits of data input using the second bit-shifted key value to generate a third scrambled data output;

transmitting the third scrambled data output over the I/O bus.

9. The method of claim 7, further comprising:

clocking the LFSR in the scrambler and a register that receives serial data input and sequentially provides serial data output with a common clock signal.

10. The method of claim 7, further comprising:

generating the initial key value agreed upon by a transmitter system and a receiver system using a predetermined algorithm.

11. The method of claim 7, further comprising:

generating the initial key value.

12. The method of claim 7, wherein the LFSR in the scrambler is re-initialized upon receiving a predetermined data character.

13. The method of claim 12, further comprising:

implementing the polynomial of $X^{16}+X^5+X^4+X^3+1$ by the LFSR.

14. The method of claim 13, wherein scrambling the first set of N-bits of data input and the second sets of N-bits of data input comprises XORing each bit of data input with a data bit from the LFSR.

15. The method of claim 7, wherein the I/O bus is a PCI Express bus.

16. An information handling system (IHS) coupled to an input/output (I/O) bus, comprising:

a microprocessor;

a memory;

a video controller;

a circular shift register that is operable to load an initial key value, wherein the initial key value is agreed upon by a transmitter system and a receiver system, each of which are coupled to the I/O bus, before the initial key value is loaded into the circular shift register, wherein the circular shift register is further operable to circularly bit-shift the initial key value to provide a bit-shifted key value; and a scrambler that is a physical layer component of the I/O bus and that is coupled to the circular shift register and the video controller and includes a linear feedback shift register (LFSR) that is operable to be initialized by receiving the input key value from the circular shift register;

wherein the LFSR is operable, during the transmission of data over the I/O bus, to be periodically re-initialized with the bit-shifted key value provided by the circular shift register in order to scramble the data transmitted over the I/O bus.

17. The IHS of claim 16, wherein the LFSR is operable to generate a serial key value output and the scrambler further comprises:

a register operable to receive the serial data input and sequentially providing the serial data output; and an XOR gate coupled to the output of the LFSR and the register and generating an XOR value of the serial data input and the serial key value output as the serial data output.

18. The IHS of claim 17, wherein the LFSR and the register are clocked by a common clock signal.

19. The IHS of claim 16, wherein the microprocessor is operable to generate the variable key value.

20. The IHS of claim 16, wherein the I/O bus is a PCI Express bus.

* * * * *